(12) United States Patent
Hui et al.

(10) Patent No.: US 10,771,364 B2
(45) Date of Patent: Sep. 8, 2020

(54) NETWORK INTERFACE CONTROLLER

(71) Applicant: Shanghai Zhaoxin Semiconductor Co., Ltd., Shanghai (CN)

(72) Inventors: Zhiqiang Hui, Beijing (CN); Jingyang Wang, Beijing (CN); Wei Shao, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 57 days.

(21) Appl. No.: 16/141,985

(22) Filed: Sep. 26, 2018

(65) Prior Publication Data

US 2019/0306040 A1 Oct. 3, 2019

(30) Foreign Application Priority Data

Mar. 27, 2018 (CN) .......................... 2018 1 0258193
Mar. 30, 2018 (CN) .......................... 2018 1 0295222
Mar. 30, 2018 (CN) .......................... 2018 1 0298515

(51) Int. Cl.
| | |
|---|---|
| *H04L 12/26* | (2006.01) |
| *H04L 29/06* | (2006.01) |
| *H04L 29/12* | (2006.01) |
| *H04L 12/02* | (2006.01) |
| *H04L 12/70* | (2013.01) |

(52) U.S. Cl.
CPC .......... *H04L 43/0847* (2013.01); *H04L 12/02* (2013.01); *H04L 29/06* (2013.01); *H04L 61/103* (2013.01); *H04L 61/6009* (2013.01); *H04L 69/166* (2013.01); *H04L 69/22* (2013.01); *H04L 61/6022* (2013.01); *H04L 2012/5614* (2013.01)

(58) Field of Classification Search
CPC ............... H04L 43/0847; H04L 61/103; H04L 61/6009; H04L 12/02; H04L 29/06; H04L 69/166; H04L 69/22; H04L 61/6022; H04L 2012/5614; H04L 69/324; H04L 69/321; H04L 12/4625
See application file for complete search history.

(56) References Cited

U.S. PATENT DOCUMENTS 7,359,326 B1 * 4/2008 Harper et al.
8,102,853 B2 * 1/2012 Ngo ...................... H04L 1/0041
                                                                370/392

(Continued)

*Primary Examiner* — Hoang-Chuong Q Vu
(74) *Attorney, Agent, or Firm* — JCIPRNET

(57) ABSTRACT

A network interface controller is provided, including a receiving module, a boundary determination module, a first checksum calculation module, and a second checksum calculation module. The receiving module receives a packet having a segment of a first layer protocol and a segment of a second layer protocol. The boundary determination module performs a boundary determination operation on the packet to generate boundary information, wherein the boundary information includes a length of the segment of the second layer protocol and a boundary indication signal. The first checksum calculation module finishes the calculation of a first checksum corresponding to the segment of the first layer protocol after receiving the length of the segment of the second layer protocol. The second checksum calculation module starts to calculate a second checksum corresponding to the segment of the second layer protocol after receiving the boundary indication signal.

17 Claims, 6 Drawing Sheets

(56) References Cited

U.S. PATENT DOCUMENTS

| | | | |
|---|---|---|---|
| 8,160,089 B1* | 4/2012 | Padiyar et al. | |
| 2004/0073703 A1* | 4/2004 | Boucher | |
| 2004/0153642 A1* | 8/2004 | Plotkin et al. | |
| 2009/0154361 A1* | 6/2009 | Dunning | |
| 2019/0149449 A1* | 5/2019 | Morris | |

* cited by examiner

NETWORK INTERFACE CONTROLLER

CROSS-REFERENCE TO RELATED APPLICATION

This application claims the priority benefits of China application serial no. 201810295222.9, filed on Mar. 30, 2018, China application serial no. 201810298515.2, filed on Mar. 30, 2018, and China application serial no. 201810258193.9, filed on Mar. 27, 2018. The entirety of each of the above-mentioned patent applications is hereby incorporated by reference herein and made a part of this specification.

BACKGROUND

Technical Field

The disclosure relates to a network interface controller, and more particularly to a network interface controller that performs checksum calculation on packets.

Description of Related Art

Please refer to FIG. 1, which is a schematic diagram showing the internal hardware of a conventional host. As shown in FIG. 1, a general host may include a central processing unit (CPU), a north bridge (NB), a south bridge (SB), and a storage unit, such as a dynamic random access memory (DRAM), wherein the north bridge and the south bridge may be integrated in the same chipset. The SB may include hardware such as a universal serial bus (USB) and a network interface controller (NIC), wherein the network interface controller may process data (e.g., "IP+TCP" packet or "IP+UDP" packet transmitted from other hosts) it receives.

Take FIG. 2 as an example. FIG. 2 is a schematic diagram of the NIC and related transmission interfaces. In FIG. 2, the NIC 200 includes a core module 202 and a suspend module 204 and is capable of processing received data from other hosts, wherein the received data is transmitted from one of other hosts to a bus receiving end (e.g., RX bus) and then processed by a physical layer (e.g., PHY 220) module and a digital-to-analog conversion host (e.g., PAD 210) module sequentially. The NIC 200 may verify whether or not the received data is correct.

In order to improve the reliability of the packet received by the NIC 200, generally there is a checksum segment in the packet for both the transmitting and receiving sides to verify the correctness of the packet. The NIC 200 needs to check every packet it receives, for example, by using the checksum segment to verify whether the packet is reliable. Conventionally, the NIC 200 may not perform checksum calculation on the pseudo header until associated checksum calculation performed on the payload in the packet is completed (since this process will constantly occupy the checksum calculation module), and then the NIC 200 reports associated checksum result to an upper layer hardware module (e.g., receiving-end state machine). As a result, the calculation of the checksum will constantly take up the resources of the NIC 200, which causes the NIC 200 to fail to receive the next packet in time, such that the NIC 200 is unable to perform checksum calculation on next packet timely and accurately. Obviously, what is needed is a NIC 200 and associated operating method capable of improving the efficiency of checksum calculation on the checksum segment, which will improve the overall efficiency when NIC 200 verifies packets and also the timeliness when the NIC 200 receives packets.

SUMMARY

The disclosure provides a network interface controller (NIC), which advances associated checksum calculation on a pseudo header of an Ethernet packet while the pseudo header is received. The efficiency of the checksum calculation to the entire packet is thus improved, thereby improving the timeliness of receiving the total checksum of the entire packet.

The disclosure provides a network interface controller, which includes a receiving module, a boundary determination module, a first checksum calculation module, and a second checksum calculation module. The receiving module is configured to receive a packet, wherein the packet includes a segment of a first layer protocol and a segment of a second layer protocol. The boundary determination module is configured to perform a boundary determination operation on the packet to generate boundary information, wherein the boundary information includes a length of the segment of the second layer protocol and a boundary indication signal. The first checksum calculation module is coupled to the boundary determination module and to complete a calculation of a first checksum corresponding to the segment of the first layer protocol after receiving the length of the segment of the second layer protocol. The second checksum calculation module is coupled to the boundary determination module to start a calculation of a second checksum corresponding to the segment of the second layer protocol after receiving the boundary indication signal.

Based on the above, the network interface controller proposed in the disclosure may use the first checksum calculation module to calculate the first checksum on the second data corresponding to the segment of the first layer protocol, so as to obtain the verification result of the packet efficiently.

To make the aforementioned and other features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
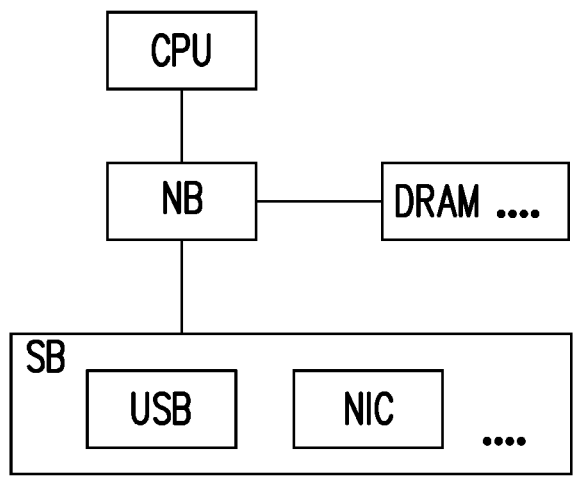
FIG. 1 is a schematic diagram showing the internal hardware of a conventional host.
Figure 2:
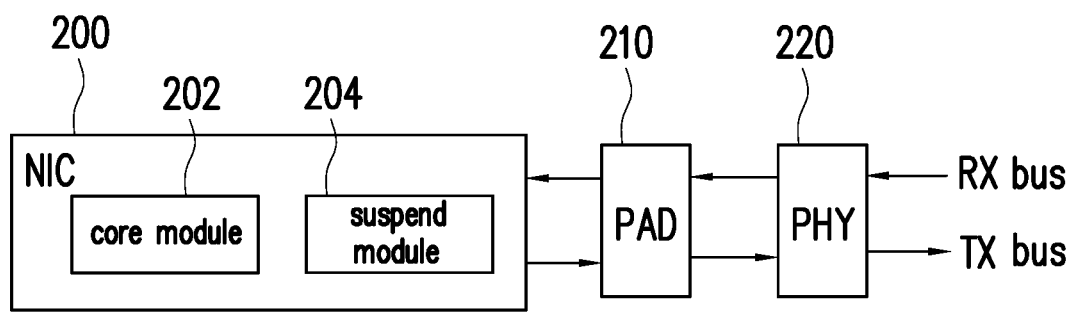
FIG. 2 is a schematic diagram of the NIC and the related transmission interfaces.
Figure 3A:
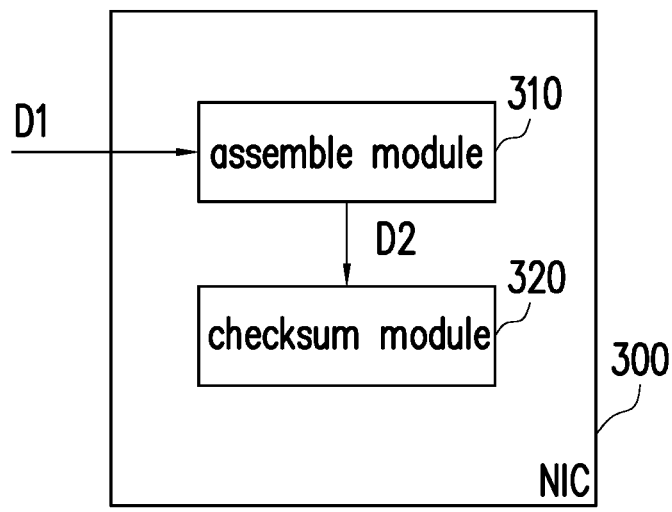
FIG. 3A is a schematic diagram of a NIC according to an embodiment of the disclosure.
Figure 3B:
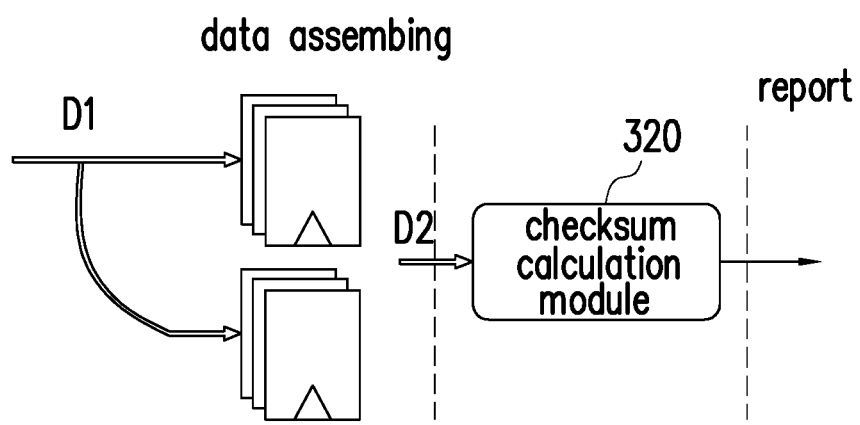
FIG. 3B is a schematic diagram showing an operation of the NIC of FIG. 3A.

Referring to FIG. 3A and FIG. 3B, FIG. 3A is a schematic diagram of a NIC 300 according to an embodiment of the disclosure, and FIG. 3B is a schematic diagram showing an operation of the NIC of FIG. 3A. As shown in FIG. 3A, the NIC 300 includes an assemble module 310 and a checksum module 320. In an embodiment, the assemble module 310 and the checksum module 320 may be disposed in a receiving end of the NIC 300, and the receiving end may be further disposed in the suspend module of FIG. 2. Thus, when the host, in which the NIC 300 is embedded, is in a sleep state or a low power consumption state, the receiving end in the NIC 300 may be still awake for checking received packets, but the disclosure is not limited thereto. In addition, the receiving end may be disposed in the core module. In an embodiment, the suspend module of FIG. 2 may include a medium access control (MAC) module, and the assemble module 310 and the checksum module 320 may be disposed in a receiving end of the MAC module. More specifically, the medium access control module may be a gigabit MAC (GMAC) module. In some embodiments, the NIC 300 may be integrated in a chipset or may be embedded in a host, wherein the host may be an electronic device capable of performing network communication, such as a laptop computer. In an embodiment, the NIC 300 may be a network interface card (or generally referred to as a "network card"), and more specifically, the NIC 300 may be a gigabit network interface card (GNIC), but the disclosure is not limited thereto. The following is described with reference to FIG. 3B.

Referring to FIG. 3B, since the data transmitted by a gigabit media independent interface (GMII) is 8-bit width, but subsequently, the checksum is calculated under 2-byte data unit (i.e., 16 bits), thus, after acquiring first data D1 from a network interface, e.g., GMII, the assemble module 310 may assemble the first data D1 into second data D2, but the disclosure is not limited thereto. For example, when the bit width of the network interface is 2 bytes, the NIC 300 may not include the assemble module 310; or, the checksum module 320 may not calculate the checksum under 2-byte data unit.

In this embodiment, the first data D1 may be an Ethernet packet, and the Ethernet packet may have different formats according to the communication protocol used by the NIC 300, which will be specifically described as follows.

In other embodiments, the NIC 300 may further include an address resolution module (not shown). When the NIC 300 receives the Ethernet packet, the address resolution module may extract an Ethernet destination address from the Ethernet packet and then compare the extracted Ethernet destination address with a local address (e.g., MAC address) of the host in which the NIC 300 is embedded. If the Ethernet destination address does not match the local address of the host, the address resolution module may ignore the Ethernet packet. On the contrary, if the Ethernet destination address matches the local address of the host, the NIC 300 may receive a plurality of pieces of the first data D1 from the Ethernet packet and forward the first data D1 to the assemble module 310.

In an embodiment, a segment of a second layer protocol in the Ethernet packet may be included in a payload of a first layer protocol. That is, the second layer protocol is the upper layer protocol of the first layer protocol. For example, the first layer protocol may be an Internet protocol (IP), such as IPv4 or IPv6, and the second layer protocol is a transmission control protocol (TCP) or a user datagram protocol (UDP). There are two different formats corresponding to these two transmission types, i.e., IP/TCP and IP/UDP. Two examples are provided in the following Table 1 and Table 2.

TABLE 1

| (IPv6 + TCP) | | | | | | | |
|---|---|---|---|---|---|---|---|
| B0 | B1 | B2 | B3 | B4 | B5 | B6 | B7 |
| | | DA | | | | SA | |
| | SA | | | Type/Length | | Ver TC | FL |
| FL | Payload Length | | NxtHeader | HopLimit | | Source IP Ad | |
| | | | Source IP Ad | | | | |
| | Source IP Ad | | | | | Des IP Ad | |
| | | | Des IP Ad | | | | |
| | | | Des IP Ad | | | TCP Source Port | |
| TCP Des Port | | | Seq Num | | | ACK num | |
| ACK num | HL/R/CODE Bit | | | Window | | TCP ChkSum | |
| Urgn Pointer | TCP payload | | | | | | |
| | | | TCP payload | | | | |

TABLE 2

| (IPv6 + UDP) | | | | | | | |
|---|---|---|---|---|---|---|---|
| B0 | B1 | B2 | B3 | B4 | B5 | B6 | B7 |
| | | DA | | | | SA | |
| | SA | | | Type/Length | | Ver TC | FL |
| FL | Payload Length | | NxtHeader | HopLimit | | Source IP Ad | |
| | | | Source IP Ad | | | | |
| | Source IP Ad | | | | | Des IP Ad | |
| | | | Des IP Ad | | | | |
| | Des IP Ad | | | | | UDP Source Port | |
| UDP Des Port | | MesLen | | UDP ChkSum | | UDP payload | |
| | | | UDP payload | | | | |

As shown above, Table 1 and Table 2 are packet formats of "IPv6+TCP" and "IPv6+UDP" without any extension header. Original texts and meanings defined in IEEE 802.3 specification are applied for references without repeating again.

As shown in Table 1, Table 1 includes the segment of the first layer protocol (i.e., IP) and the segment of the second layer protocol (i.e., TCP), wherein the segment of TCP is included in the payload of IP. Similarly, Table 2 also includes the segment of the first layer protocol (i.e., IP) and the segment of the second layer protocol (i.e., UDP), wherein the segment of UDP is included in the payload of IP. For the sake of brief illustrations, TCP is used as an example of the second layer protocol hereinafter, from which those skilled in the art may infer how to use UDP as the second layer protocol.

After the assemble module 310 assembles the first data D1 (with 8-bit width, for example) into the second data D2 (with 16-bit width, for example), the checksum module 320 may continue to calculate a checksum of the second data D2 corresponding to the TCP segment (that is, a payload checksum, which is the checksum calculation result of the data in the TCP header and the TCP payload segment). After the payload checksum is obtained, the checksum module 320 may further perform an addition operation on the payload checksum and the pseudo header shown in the following Table 3 to obtain the verification result, which may indicate whether the NIC 300 has correctly received the Ethernet packet (e.g., the Ethernet packet has been correctly received if the verification results are all 0; otherwise, the Ethernet packet is not received correctly or the received Ethernet packet is incorrect).

TABLE 3

(Pseudo Header)

Source IP address
Destination IP address
Length of the segment of the upper layer protocol
Zero                     Next header In an embodiment, firstly, the checksum module 320 may respectively fill in the "Source IP Ad", "Des IP ad", and "NxtHeader" segments in the second data D2 that are corresponding to Table 1 into the "Source IP address", "Destination IP address", and "Next header" segments in Table 3. Next, the checksum module 320 may calculate the "length of the segment of the upper layer protocol" and then fill it into Table 3. In another embodiment, since the boundary between the IP segment and the TCP segment may be recognized by calculating the "length of the segment of the upper layer protocol", the calculation operation related thereto may be called a boundary determination operation, but the disclosure is not limited thereto.

In an embodiment, assuming that the checksum module 320 applies the packet format "IPv6+TCP" without any extension header therein, "the length of the segment of the upper layer protocol" may be obtained directly from the second data D2 with reference to Table 1 (such as the "Payload Length" shown in Table 1 and Table 2). Specifically, in the case of no extension header being applied, the payload length of IP is the segment length of TCP (i.e., the upper layer protocol of IP), such that the checksum module 320 may directly obtain the payload length of IP from the segment of the second data D2, which corresponds to the "Payload Length" of Table 1. The obtained payload length of IP is then filled in the "length of the segment of the upper layer protocol" of Table 3, that is, the checksum module 320 may directly use the payload length of IP as the length of the segment of TCP.

In another embodiment, assuming that the checksum module 320 applies the packet format "IPv6+TCP" with one or more extension headers (as shown in Table 4 below, there are two more "Next header+Hdr ext len+Options" compared with Table 1), the checksum module 320 may calculate the segment length of TCP by subtracting the length of each extension header from the payload length of IP, i.e., length of TCP=Payload Length ("Payload Length" shown in Table 4)–the first extension header Length (the middle "Next header" shown in Table 4)–the second extension header Length (the last "Next header" shown in Table 4).

TABLE 4

| B0 | B1 | B2 | B3 | B4 | B5 | B6 | B7 |
|----|----|----|----|----|----|----|----|
|  |  | DA |  |  |  | SA |  |
|  | SA |  | Type/Length |  | Ver | TC | FL |
| FL |  | Payload Length | Next header | HopLimit |  | Source IP Ad |  |
|  |  |  | Source IP Ad |  |  |  |  |
|  |  | Source IP Ad |  |  |  | Des IP Ad |  |
|  |  |  | Des IP Ad |  |  |  |  |
|  |  | Des IP Ad |  |  |  | Next header | Hdr ext len |
|  |  |  | Options |  |  |  |  |
|  |  | Options |  |  |  | Next header | Hdr ext len |
|  |  |  | Options |  |  |  |  |
|  |  | Options |  |  |  | TCP Source Port |  |
| TCP Des Port |  | Seq Num |  |  |  | ACK num |  |
| ACK num |  | HL/R/CODE Bit |  | Window |  | TCP ChkSum |  |
| Urgn Pointer |  | TCP payload |  |  |  |  |  |
| TCP payload |  |  |  |  |  |  |  |

Please refer to Table 4 above, which exemplarily shows a packet format "IPv6+TCP" including two extension headers. Similar to the previous embodiment, the meaning of each segment in Table 4 may be recognized by referring to the IEEE 802.3 specification and thus will not be repeated here.

In the example of Table 4, the checksum module 320 may obtain the payload length of IP from the segment of the second data D2, which corresponds to "Payload Length" of Table 4, and then calculate the length of the segment of TCP by subtracting the length of each extension header from the payload length of IP. Details may be understood by referring to the IEEE 802.3 specification and thus will not be repeated here.

After calculating the "length of the segment of the upper layer protocol" according to the above, the checksum module 320 may generate a boundary indication signal and fill the "length of the segment of the upper layer protocol" in Table 3 accordingly.

After filling all fields of Table 3, the checksum module 320 may add the contents of Table 3 to the checksum of the TCP header and TCP payload (i.e., the payload checksum) to obtain the verification result. In an embodiment, the process of calculating the payload checksum exemplarily includes: (1) the second data D2 corresponding to the TCP header and the TCP payload is grouped under 16-bit data units (i.e., 2 bytes); (2) the calculation process is to perform cycle carry additions on the 16-bit binary numbers and if there is a carry out of the most significant bit after additions, this carry will be carried to the least significant bit (1's complement sum); (3) after accumulation, a complementary operation is then performed on the accumulation result, thereby acquiring the checksum of the TCP header and the TCP payload (referred to as "second checksum" hereinafter).

Next, the checksum module 320 may further accumulate the contents of Table 3 under 16-bit data unit (i.e., 2 bytes) with the checksum of the TCP header and the TCP payload to calculate the verification result.

It is known from the above that the checksum module 320 first calculates the checksum of the TCP header and the TCP payload, and then accumulates this checksum and the contents of the pseudo header to obtain the verification result. Assuming that the length of the pseudo header is 40 bytes, the process of accumulating the pseudo header into the payload checksum will take at least 20 cycles (2 bytes are needed per cycle, for example), and the minimum interval between two adjacent packets is 12 cycles practically. Therefore, when the network interface starts to receive the next packet, a previously received packet is still under verification, which impairs the overall efficiency of the NIC 300 in receiving and verifying packets. Further descriptions are given with references to FIG. 4.

Figure 4:
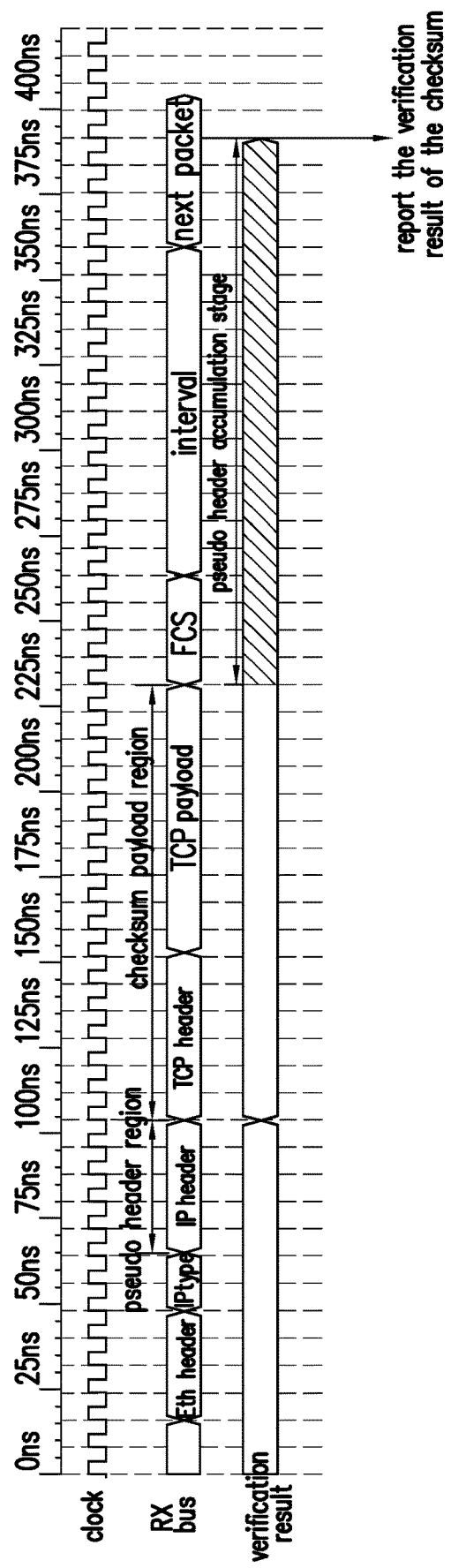
FIG. 4 is a schematic diagram showing the signal timing diagram according to FIG. 3A and FIG. 3B.

Referring to FIG. 4, FIG. 4 is a signal timing diagram according to the operations of the NIC 300 in FIG. 3A and FIG. 3B. As shown in FIG. 4, after calculating the checksum of the TCP header and the TCP payload, the process enters a pseudo header accumulation stage (that is, the stage of accumulating the pseudo header into the aforementioned checksum), while the time of the pseudo header accumulation stage is determined by the length of the pseudo header. Obviously, relevant hardware used for calculating the checksum will be constantly occupied during the whole pseudo header accumulation stage.

The minimum interval between Ethernet packets is 96-bit time, and this interval is 12 cycles under 1 G mode. However, in the case of IPv6, the pseudo header accumulation stage requires at least 20 cycles, and at least 16 cycles are required to complete the calculation even if a frame check sequence (FCS) stage (i.e., cyclic redundancy check (CRC), which requires four cycles to cover the verification of the entire Ethernet packet), is excluded. As a result, the verification result cannot be reported to the upper layer elements (such as the receiving-end state machine in the receiving end) until 16 cycles later when one Ethernet packet has been completely received. In the case of operating with a linear speed, the time point at which the verification result is reported has fallen into the transmission stage of the next Ethernet packet, e.g., the receiving side has started to receive the next Ethernet packet several cycles ago, which affects the transmission efficiency of the next Ethernet packet and makes the transmission control logic become relatively complicated.

Thus, according to an embodiment of the disclosure, a NIC is further provided, which calculates the first checksum of the pseudo header by specific hardware in advance, and after obtaining the checksum of the TCP header and the TCP payload (referred to as "second checksum"), the first checksum and the second checksum are applied to obtain the verification result. In other words, the NIC provided by the disclosure does not need accumulate the pseudo header into the second checksum after the second checksum being completely calculated. According to the embodiment of the disclosure, the time point starting to calculate the checksum of the pseudo header is advanced, which shortens the time for obtaining the verification result and improves the efficiency. Details are provided below.

Figure 5A:
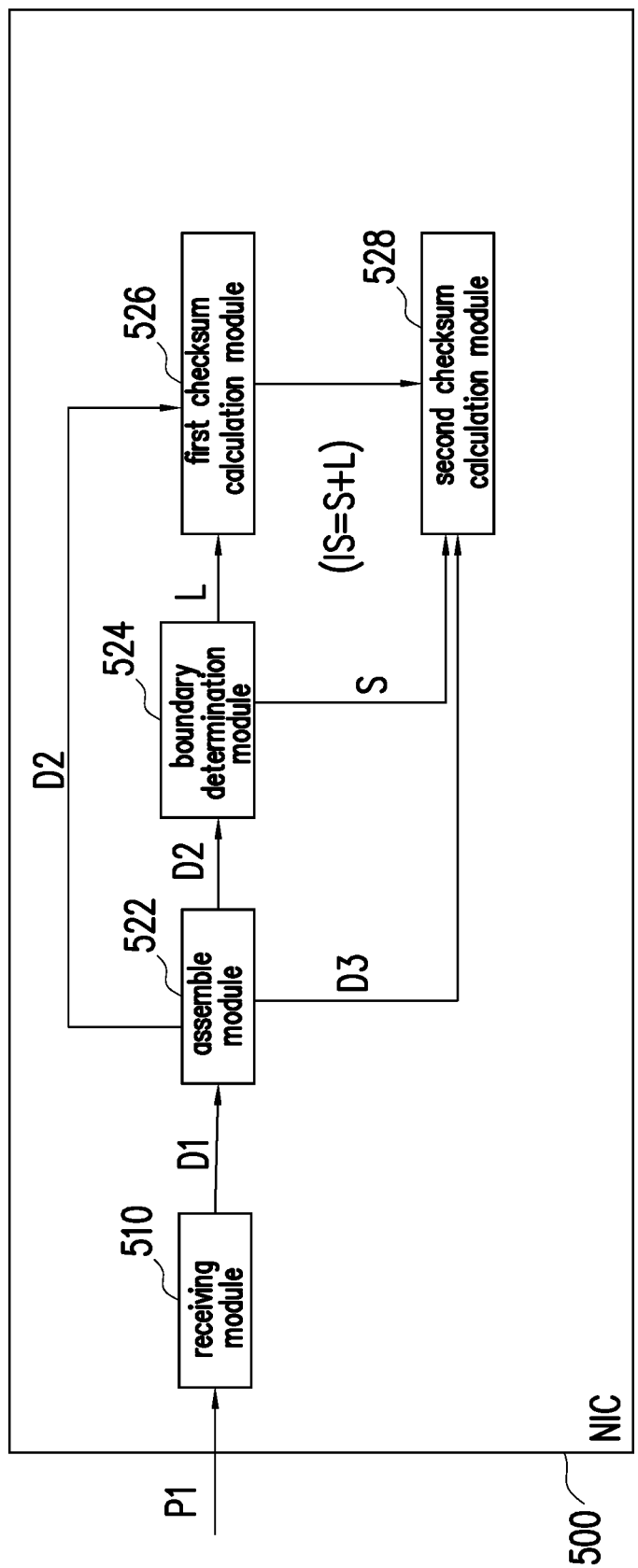
FIG. 5A is a schematic diagram of a NIC according to an embodiment of the disclosure.
Figure 5B:
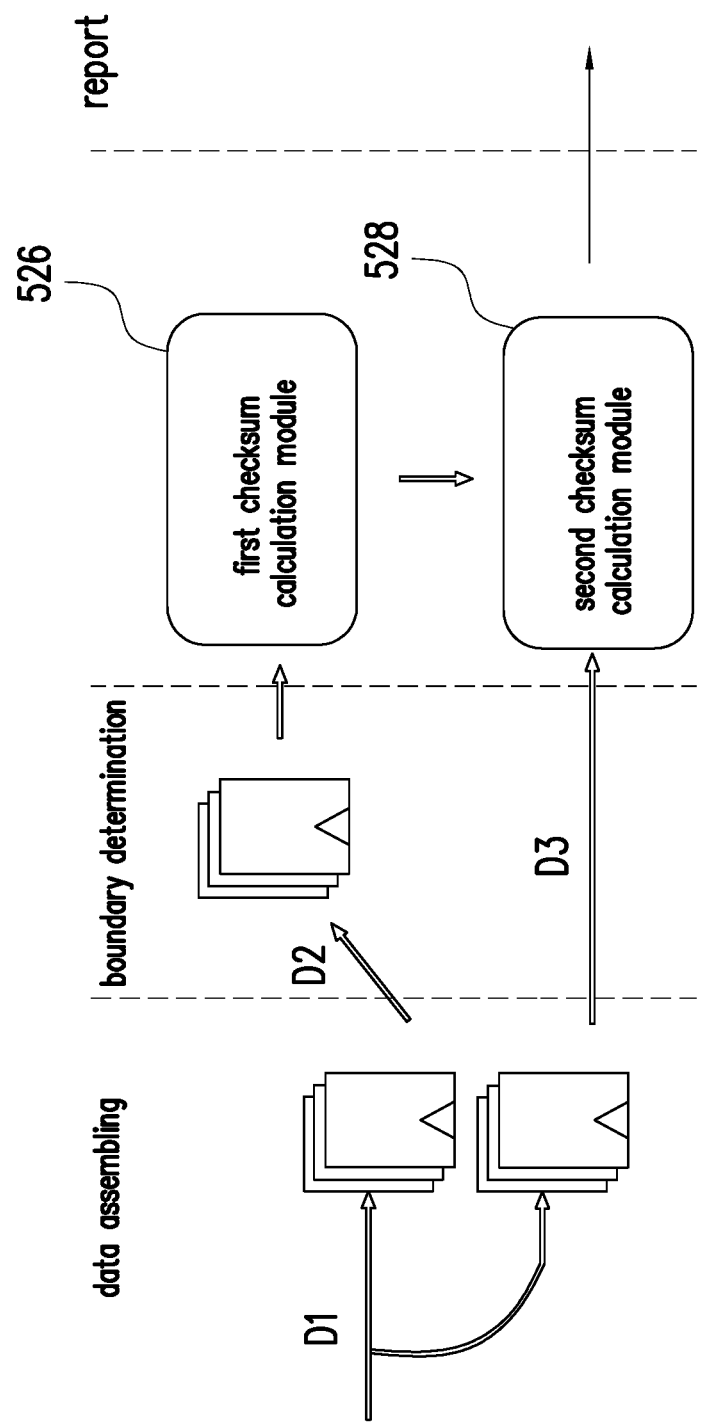
FIG. 5B is a schematic diagram showing an operation of the NIC of FIG. 5A.

Referring to FIG. 5A and FIG. 5B, FIG. 5A is a schematic diagram of an NIC 500 according to an embodiment of the disclosure, and FIG. 5B is a schematic diagram showing an operating flow of the NIC 500 of FIG. 5A. As shown in FIG. 5A, the NIC 500 includes a receiving module 510, a boundary determination module 524, a first checksum calculation module 526, and a second checksum calculation module 528. In this embodiment, the receiving module 510, the boundary determination module 524, the first checksum calculation module 526, and the second checksum calculation module 528 may be disposed in the receiving end of the GMAC module of the suspend module of FIG. 2 to cooperate mutually, so as to perform the required checksum calculation when receiving a packet P1. In addition, in an embodiment, the boundary determination module 524 is integrated inside the first checksum calculation module 526.

In an embodiment, the NIC 500 further includes an assemble module 522 for assembling the 8-bit first data D1 received from the receiving module 510 into the 16-bit second data D2, while the first checksum calculation module 526 and the second checksum calculation module 528 respectively calculate the first checksum and the second checksum based on the 16-bit second data D2. It should be noted that the aforementioned bit widths are merely examples, and the disclosure is not limited thereto. In addition, if the bit width of the receiving module 510 is the same as those of the first checksum calculation module 526 and the second checksum calculation module 528, the NIC 500 may not include the assemble module 522. The assemble module 522 assembles the first data D1 (8-bit width, for example) into the second data D2 (16-bit width, for example). The boundary determination module 524 is coupled to the assemble module 522 and performs a boundary determination operation on the second data D2 to generate boundary information IS, wherein the boundary determination operation is to determine the boundary between the IP segment and the TCP segment, and the boundary information IS includes a length L of the segment of an upper layer protocol and a boundary indication signal S (i.e., IS includes S and L shown in FIG. 5A). Details of the assembling operation performed by the assemble module 522 and the boundary determination operation performed by the boundary determination module 524 may be understood by referring to the previous embodiment and thus will not be repeated herein. In the above embodiment, the boundary determination module 524 is coupled behind the assemble module 522, but the disclosure is not limited thereto. For example, in an embodiment, the boundary determination module 524 may be coupled behind the receiving module 510 and before the assemble module 522. In another embodiment, the assemble module 522 and the boundary determination module 524 may be integrated in one module.

The first checksum calculation module 526 is coupled to the boundary determination module 524. After receiving the length L of the segment of the upper layer protocol transmitted from the boundary determination module 524, the first checksum calculation module 526 completes calculation of the first checksum corresponding to the segment of the IP protocol (corresponding to the second data D2 shown in FIG. 5A).

It should be noted that, in an embodiment, the first checksum calculation module 526 directly extracts related segments of the pseudo header (including the source IP address, the destination IP address, the next header segment, and so on) from the segment of the IP protocol and starts the calculation of the first checksum. For example, after extracting a fixed length data (2 bytes, for example) of the source IP address, the first checksum calculation module 526 starts to calculate the first checksum under 2-byte data unit. In other words, whenever the first checksum calculation module 526 extracts a fixed length data (2 bytes, for example) of a related segment, the first checksum calculation module 526 calculates the checksum of the fixed length data (2 bytes, for example), and then adds it with an intermediate result of the first checksum temporarily stored in a register (not shown), such that this register may temporarily store the final first checksum therein. In an embodiment, the first checksum calculation module 526 further includes the aforementioned register. When the first checksum calculation module 526 completes the calculation of the first checksum, the first checksum is temporarily stored in the register. And, when the second checksum calculation module 528 completes the calculation of the second checksum, the final verification result is obtained based on the calculated second checksum and the temporarily stored first checksum.

In an embodiment, after the boundary determination module 524 obtains the content being filled in Table 3, the first checksum calculation module 526 may directly calculate the final first checksum based on the length L of the segment of the upper layer protocol transmitted from the boundary determination module 524 and the temporarily stored intermediate result (corresponding to the segment of IP) of the first checksum (that is, the first checksum calculated based on the pseudo header).

Thereafter, the second checksum calculation module 528 coupled to the assemble module 522 starts to calculate the second checksum of the second data D3 corresponding to the segment of TCP after receiving the boundary indication signal S transmitted from the boundary determination module 524. In other words, the second checksum calculation module 528 may calculate the second checksum of the TCP header and the TCP payload (corresponding to the second data D3 shown in FIG. 5A).

Next, when the second checksum calculation module 528 completes the calculation of the second checksum, the second checksum calculation module 528 performs an operation based on the second checksum and the first checksum received from the first checksum calculation module 526 to obtain the verification result of the packet P1, while the verification result is then reported to the receiving-end state machine in the receiving end. In an embodiment, the verification result may be obtained by the second checksum calculation module 528 by the means of reversing the carry derived from the addition (or other operation) of the first checksum and the second checksum. In an embodiment, the second checksum calculation module 528 may obtain the first checksum calculated by the first checksum calculation module 526 from a register.

Figure 6:
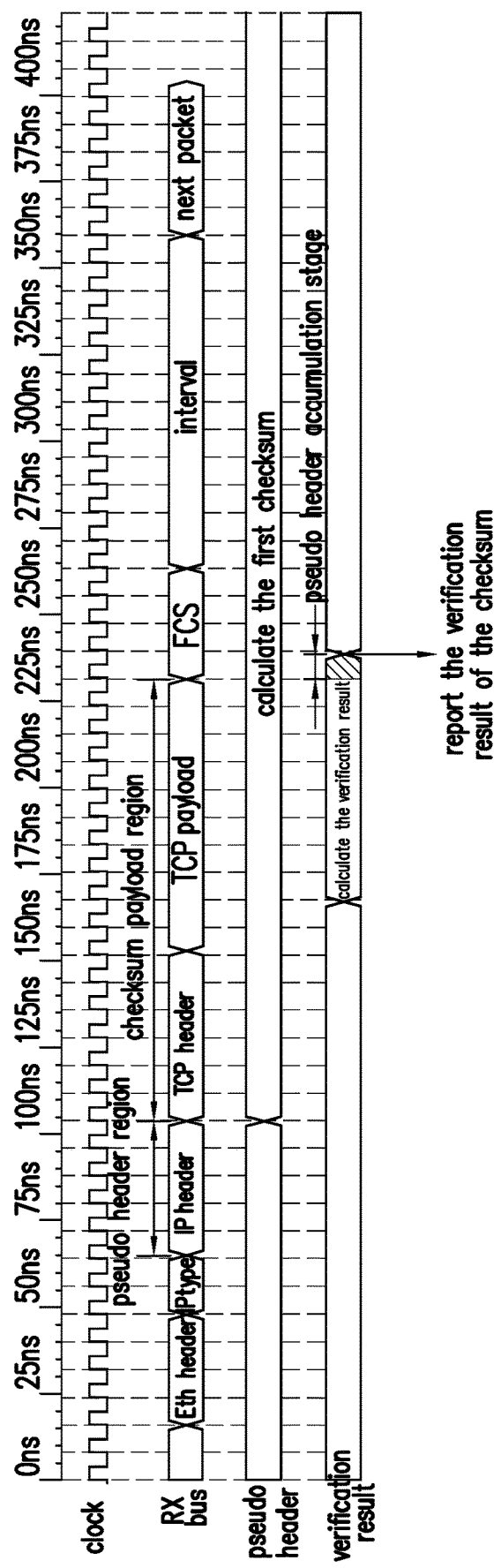
FIG. 6 is a schematic diagram showing the signal timing diagram according to FIG. 5A and FIG. 5B.

FIG. 6 is a schematic diagram showing the signal timing diagram according to FIG. 5A and FIG. 5B. As shown in FIG. 6, after obtaining parts (2 bytes, for example) of the related segment of the pseudo header, the first checksum calculation module 526 may calculate the first checksum accordingly. In other words, the time point at which the first checksum calculation module 526 starts to calculate the first checksum is earlier than the time point at which the second checksum calculation module 528 starts to calculate the second checksum. After the second checksum calculation module 528 calculates the second checksum of the TCP header and the TCP payload, the verification result may be obtained based on the first checksum and the second checksum within the pseudo header accumulation stage after one cycle only. As shown in FIG. 6, the second checksum calculation module 528 obtains the verification result of the checksum in the cycle right after the RX bus receives the data of the checksum payload (including the TCP header and the TCP payload) used for completing the calculation of the second checksum.

In other words, in comparison with the pseudo header accumulation stage as shown in FIG. 4 (which takes at least 16 cycles), the time required by the pseudo header accumulation stage in FIG. 6 is shortened to 1 cycle only. Therefore, the verification result of the packet P1 may be obtained before the packet P1 is completely transmitted without taking up the time of processing the next packet. Thus, the obtained verification result may be reported to the upper layer (the state machine of the receiving end, for example) along with other packet information, so as to improve the transmission efficiency.

To sum up, the NIC 500 according to the disclosure may calculate the first checksum of the pseudo header in advance by an additional checksum calculation module. Thus, after the second checksum of the TCP header and the TCP payload is obtained, only one cycle is needed to obtain the verification result according to the first checksum and the second checksum. In other words, the NIC 500 in the disclosure does not need to wait for the second checksum being calculated completely to accumulate the pseudo header into the second checksum. Therefore, the time for obtaining the verification result is shortened and the efficiency is improved. Moreover, since the verification result of the packet may be obtained before packet transmission is completed, it does not take up the time of processing the next packet or affect the transmission of the next packet.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A network interface controller, comprising:
 a receiving circuit configured to receive a packet, wherein the packet comprises a segment of a first layer protocol and a segment of a second layer protocol;
 a boundary determination circuit configured to perform a boundary determination operation on the packet to generate boundary information, wherein the boundary information comprises a length of the segment of the second layer protocol and a boundary indication signal;

a first checksum calculation circuit coupled to the boundary determination circuit to complete a calculation of a first checksum corresponding to the segment of the first layer protocol after receiving the length of the segment of the second layer protocol; and a second checksum calculation circuit coupled to the boundary determination circuit to start a calculation of a second checksum corresponding to the segment of the second layer protocol after receiving the boundary indication signal.

2. The network interface controller according to claim 1, wherein when the second checksum calculation circuit completes the calculation of the second checksum, the second checksum calculation circuit performs an operation based on the second checksum and the first checksum received from the first checksum calculation circuit to obtain a verification result of the packet.

3. The network interface controller according to claim 2, wherein the second checksum calculation circuit obtains a verification result at one cycle after completing calculation of the second checksum.

4. The network interface controller according to claim 2, wherein the network interface controller further comprises a receiving-end state machine for receiving the verification result.

5. The network interface controller according to claim 1, wherein the boundary determination circuit is integrated inside the first checksum calculation circuit.

6. The network interface controller according to claim 1, wherein a time point at which the first checksum calculation circuit starts to calculate the first checksum is earlier than a time point at which the second checksum calculation circuit starts to calculate the second checksum.

7. The network interface controller according to claim 1, wherein the first checksum calculation circuit directly extracts a plurality of related segments from the segment of the first layer protocol to calculate the first checksum.

8. The network interface controller according to claim 7, wherein the related segments comprise a source IP address of the first layer protocol, a destination IP address of the first layer protocol, and a next header segment.

9. The network interface controller according to claim 1, wherein whenever the first checksum calculation circuit extracts a related segment with a fixed length, the first checksum calculation circuit calculates a checksum of the related segment with the fixed length and adds the checksum of the related segment with the fixed length to an intermediate result of the first checksum.

10. The network interface controller according to claim 9, wherein the first checksum calculation circuit comprises a register, which is configured for temporarily storing the intermediate result of the first checksum during calculation of the first checksum.

11. The network interface controller according to claim 1, wherein the network interface controller further comprises an assemble circuit, which is configured to assemble at least first data received from the receiving circuit into second data, wherein the first data is a part of the packet, and a bit width of the second data is greater than a bit width of the first data.

12. The network interface controller according to claim 11, wherein the first checksum calculation circuit and the second checksum calculation circuit respectively calculate the first checksum and the second checksum based on the second data.

13. The network interface controller according to claim 1, wherein the first layer protocol is an Internet protocol (IP), and the segment of the second layer protocol is included in a first payload of the segment of the first layer protocol.

14. The network interface controller according to claim 1, wherein the second layer protocol is a transmission control protocol or a user datagram protocol.

15. The network interface controller according to claim 1, wherein the first checksum calculation circuit calculates the first checksum based on a pseudo header, wherein the pseudo header comprises a source IP address, a destination IP address, and a next header segment of the first layer protocol and the length of the segment of the second layer protocol, wherein the length of the segment of the second layer protocol is calculated by the boundary determination circuit.

16. The network interface controller according to claim 1, wherein the receiving circuit, the boundary determination circuit, the first checksum calculation circuit, and the second checksum calculation circuit are integrated in a suspend circuit.

17. The network interface controller according to claim 1, wherein the packet is transmitted to the receiving circuit through a gigabit media independent interface.

* * * * *